United States Patent
Lidman

(10) Patent No.: US 9,529,732 B2
(45) Date of Patent: Dec. 27, 2016

(54) KEY ROTATION FOR A MEMORY CONTROLLER

(71) Applicant: MARVELL WORLD TRADE LTD., St. Michael (BB)

(72) Inventor: Pontus Lidman, Saratoga, CA (US)

(73) Assignee: MARVELL WORLD TRADE LLC (BB)

( * ) Notice: Subject to any disclaimer, the term of this patent is extended or adjusted under 35 U.S.C. 154(b) by 122 days.

(21) Appl. No.: 14/335,310

(22) Filed: Jul. 18, 2014

(65) Prior Publication Data

US 2015/0033037 A1    Jan. 29, 2015

Related U.S. Application Data

(60) Provisional application No. 61/858,007, filed on Jul. 24, 2013.

(51) Int. Cl.
| | | |
|---|---|---|
| G06F 11/30 | (2006.01) | |
| G06F 12/14 | (2006.01) | |
| G06F 21/78 | (2013.01) | |
| G06F 21/79 | (2013.01) | |
| H04L 9/08 | (2006.01) | |

(52) U.S. Cl.
CPC ........... *G06F 12/1408* (2013.01); *G06F 21/78* (2013.01); *G06F 21/79* (2013.01); *H04L 9/0891* (2013.01)

(58) Field of Classification Search
CPC .. G06F 21/10; G06F 2221/2107; G06F 21/72; G06F 21/31; G06F 21/32; G06F 12/1408; G11B 20/00086; G11B 20/0021; H04L 9/08; H04L 9/18; H04L 9/00
See application file for complete search history.

(56) References Cited

U.S. PATENT DOCUMENTS

| | | | | |
|---|---|---|---|---|
| 5,412,722 | A * | 5/1995 | Sherly et al. | 380/273 |
| 5,987,572 | A * | 11/1999 | Weidner et al. | 711/155 |
| 2005/0149932 | A1 * | 7/2005 | Hasink et al. | 718/100 |
| 2005/0204154 | A1 | 9/2005 | Osaki | |
| 2006/0204005 | A1 * | 9/2006 | Hassan et al. | 380/44 |
| 2008/0260159 | A1 | 10/2008 | Osaki | |
| 2009/0048976 | A1 | 2/2009 | Hars | |
| 2011/0191595 | A1 * | 8/2011 | Damian et al. | 713/189 |
| 2014/0164793 | A1 * | 6/2014 | Hadley | 713/193 |

OTHER PUBLICATIONS

Patent Cooperation Treaty (PCT) International Search Report and Written Opinion, co-pending International Application No. PCT/US2014/047215 (International Filing Date of Jul. 18, 2014), having a date of mailing of Oct. 16, 2014 (17 pgs).

* cited by examiner

*Primary Examiner* — Ali Abyaneh

(57) ABSTRACT

Systems, methods, and other embodiments associated with rotating keys for a memory are described. According to one embodiment, a memory system comprises a memory controller configured to control access to a memory and to process memory access requests. Rekeying logic is configured to rotate a first key that was used to scramble data in the memory and re-scramble the data with a second key by: determining when the memory controller is in an idle cycle and performing a rekeying operation on a portion of the memory during the idle cycle, and pausing the rekeying operation when the memory controller is not in an idle cycle to allow memory access requests to be performed and resuming the rekeying operation during a next idle cycle.

18 Claims, 7 Drawing Sheets

KEY ROTATION FOR A MEMORY CONTROLLER

CROSS REFERENCE TO RELATED APPLICATIONS

This patent disclosure claims the benefit of U.S. Provisional Application Ser. No. 61/858,007 filed on Jul. 24, 2013 which is hereby wholly incorporated by reference.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Hackers exploit weaknesses in computer systems or networks to obtain data from a memory. To reduce the likelihood that a hacker would be able to read ill-gotten data, the data is scrambled (i.e., encrypted) according to a mathematical scrambling function. The hacker then has to discover the scrambling function that was used to scramble the data in order to unscramble (i.e., decrypt) the scrambled data. To discover the scrambling function, the hacker may attack a component of a computer system, such as a system on chip (SOC), and make requests to write input values to a memory. By analyzing the output values of the memory to the input values, the hacker can try to reverse engineer the operations of the scrambling function. The more time a hacker has to analyze the output, the greater the likelihood that the hacker will be able to determine the scrambling function and use the function to unscramble the scrambled data from the memory.

In some encryption techniques, the scrambling function is based on a key. The key is a piece of information (e.g., a value, parameter) that is known only to individuals that have been authorized to read the scrambled data. To increase security of the data, the key is changed periodically in order to change the scrambling function and consequently, change how the data is scrambled and unscrambled. Because the scrambling function is dependent on the key, changing the key periodically increases the security of the memory since a hacker would have less time to discover the scrambling function before the scrambling function changes. Typically, a key is changed during the initial boot sequence of a computer system when the computer system is turned on after having been powered down. However, weeks or even months may elapse before the computer system is powered down and turned back on, which leaves the data more vulnerable to being unscrambled. Therefore, revoking the key and replacing the revoked key with a new key, referred to as key rotation, reduces this vulnerability. However, typically, key rotation requires processing time and significant resources, and thus, is done infrequently despite increased vulnerability.

SUMMARY

In general, in one aspect this specification discloses a memory system that comprises a memory controller configured to control access to a memory and to process memory access requests. Rekeying logic is configured to rotate a first key that was used to scramble data in the memory and re-scramble the data with a second key by: determining when the memory controller is in an idle cycle and performing a rekeying operation on a portion of the memory during the idle cycle; and pausing the rekeying operation when the memory controller is not in an idle cycle to allow memory access requests to be performed and resuming the rekeying operation during a next idle cycle.

In general, in another aspect, this specification discloses a method that comprises setting a boundary address in a memory for a rekeying operation that rotates keys for data in the memory. In response to receiving memory access requests, processing, by a memory controller, the memory access requests to the memory. The method determines when the memory controller is in an idle cycle and in response to being in the idle cycle, the method comprises: performing the rekeying operation on a portion of the memory at the boundary address during the idle cycle; incrementing the boundary address and repeating the rekeying operation; and pausing the rekeying operation when the memory controller is not in an idle cycle to allow the memory access requests to be performed and resuming the rekeying operation during a next idle cycle.

In general, in another aspect, this specification discloses a method that comprises setting a boundary address in a memory for a rekeying operation that rotates encryption keys for data in the memory, wherein the boundary address is a boundary between a first portion of the memory that is encrypted with a first key and a second portion of the memory that is encrypted with a second key. In response to receiving an access request for a requested address in the memory, the method comprises: pausing the rekeying operation; comparing the requested address to the boundary address to determine if the requested address is in the first portion or the second portion of the memory; selecting the first key or the second key based on the comparison; and processing the access request using the selected key.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa.

DETAILED DESCRIPTION

In data encryption, key rotation is the process of revoking a first encryption key that was used to scramble a set of data and replacing the first key with a different second key. Key rotation further includes rekeying the data according to the second key. To rekey data, the data is descrambled with the first key and re-scrambled according to the second key. For example, to rekey the contents of a dynamic random access memory (DRAM), the entire contents of the DRAM are descrambled with the first key and re-scrambled according to the second key. The process of rotating the keys and consequently rekeying the data may be lengthy, require a significant number of resources, and interrupt and/or delay normal operations of the memory.

Described herein are examples of systems, methods, and other embodiments associated with key rotation for a memory controller. In one embodiment, data is rekeyed during idle cycles of the memory controller to reduce the impact of rekeying data on the normal operation of the memory. For example, suppose that the memory controller controls a memory that stores scrambled data. In an idle cycle, the memory controller is not processing access requests to the memory. Conversely, in an active cycle, the memory controller is processing access requests to read data from the memory and/or write data to the memory. To avoid interrupting the access requests to the memory during an active cycle, the data is descrambled and re-scrambled during the idle cycles of the memory controller. Thus rekeying operations are performed in between memory operations to allow for normal memory access as well as rekeying. In one embodiment, the rekeying process may run as a background process in the memory controller without delaying or interrupting access requests.

The disclosed systems and methods provide the ability to re-scramble data more frequently, which is not dependent upon a system reset or powering down of the computer. The re-scrambling and re-keying may be performed in portions of memory that allow for continued operation of the memory.

Figure 1:
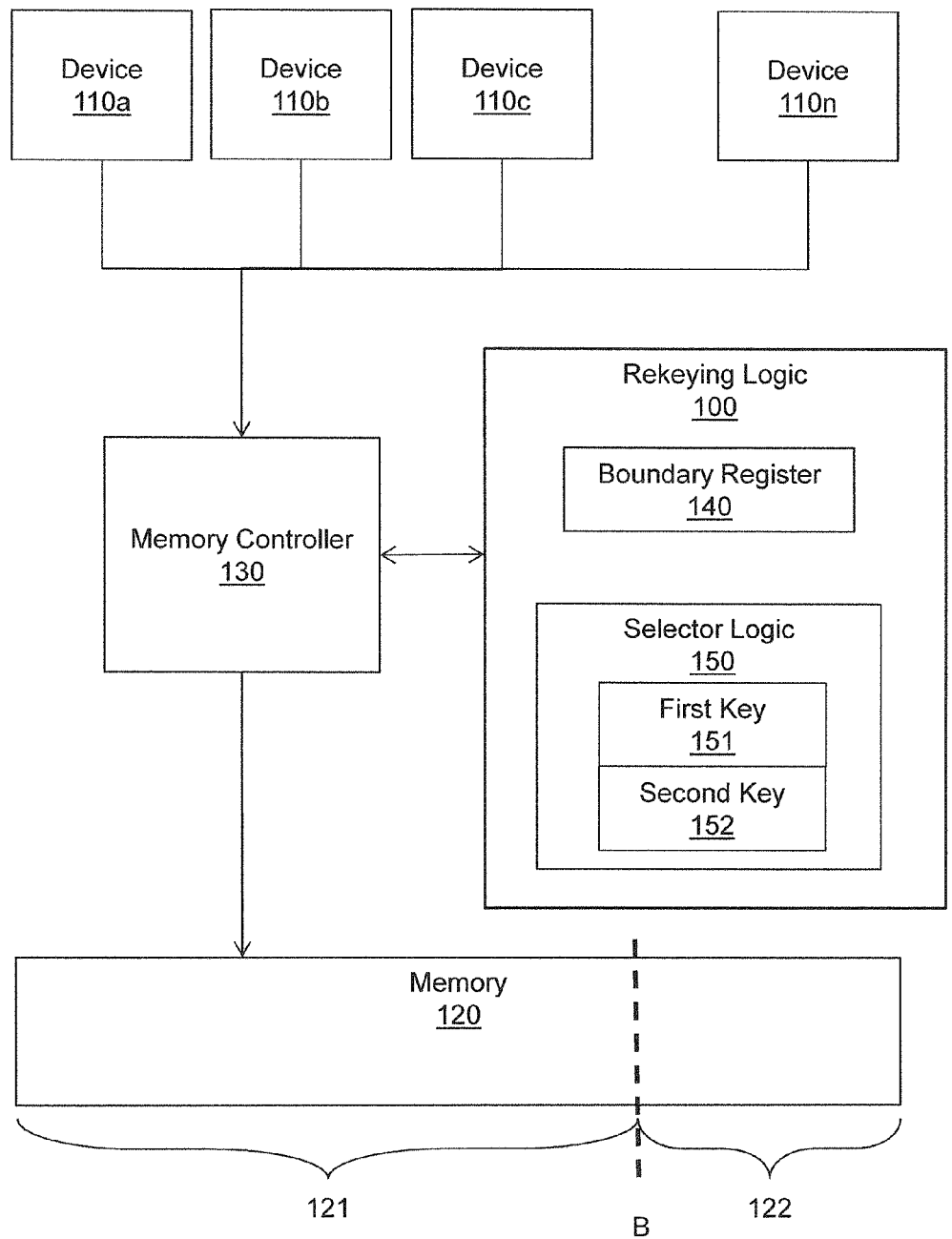
FIG. 1 illustrates one embodiment of a system associated with key rotation for a memory controller.

FIG. 1 illustrates one embodiment of a memory system that includes rekeying logic 100 for rotating encryption keys associated with a memory 120 and a memory controller 130. The rekeying logic 100 may be implemented in a computing system or computer readable medium, and may be implemented as part of the memory controller 130 or as a separate component that operates with the memory controller 130. For purposes of explanation, devices 110a, 110b, 110c, to 110n are configured to access the memory 120 via the memory controller 130. The memory controller 130 is configured to control access to the memory 120 and process memory access requests (e.g., read requests or write requests) that are received from the devices 110a-110n.

For example, a write access request is completed when data is written to the memory 120, and a read access request is completed when the requested data is read from the memory 120 and returned to the requesting device. In one embodiment, the memory controller 130 is implemented in as a hardware component with integrated circuits configured to perform the disclosed functions, may be a processor configured to perform memory requests, and/or may include firmware or executable instructions for performing the functions disclosed.

Accordingly, the memory controller 130 manages the data flow between the devices 110a-110n and the memory 120. An example device 110a-110n may be a computer processing unit CPU, a hardware device, a system-on-chip (SOC) device, or other component that is part of the computing system, which the memory controller 130 is also part of (e.g., in a single computing device). The memory 120 is a device used to store data in or for a computing device including, but not limited to, non-volatile memory (e.g., flash memory, read-only memory, programmable read-only memory) and volatile memory (e.g., random access memory, dynamic random access memory, static random access memory). The memory controller 130 may be integrated into a chip, such as an SOC, with the memory 120, configured as a chip separate from the memory 120, and may include firmware for performing certain functions.

When the memory controller 130 is not managing data flow between the devices 110a-110n and the memory 120, the memory controller 130 is idle. When idle, the memory controller 130 is available to rekey data stored in the memory 120. In one embodiment, the rekeying logic 100 is configured to identify the idle periods of the memory controller 130 and control the rekeying process of the data in the memory 120 during the idle periods.

For example, the rekeying logic 100 is configured to determine that the memory controller 130 is idle in one or more ways. In one embodiment, the rekeying logic 100 monitors the activity of the memory controller 130 to determine when the memory controller is not processing memory requests and is thus idle. The monitoring may include checking a queue that holds memory requests and if the queue is empty, the rekeying logic 100 determines that the controller 130 is idle. In another embodiment, the memory controller 130 is configured to send a rekeying notice that is received by the rekeying logic 100. The rekeying notice indicates that the memory controller 130 is idle and available to rekey data. In this embodiment, the rekeying logic 100 initiates the rekeying process (or restarts an incomplete rekeying process) upon receiving the rekeying notice.

The rekeying process may be in two different states. One state is where all data in the memory has been previously rekeyed (with an old key) and a new rekeying process is beginning (with a new key). Another state is where the rekeying process has begun but has not yet completed. Thus a portion of the data in the memory 120 has been rekeyed with a new key and a portion of the data has not been rekeyed (meaning the data is currently keyed with an old key). In one embodiment, since the rekeying process is performed during idle periods of the controller 130, the rekeying process will typically start and stop multiple times before all data in the memory 120 is completely rekeyed.

To rekey the data, the memory controller 130 uses information about where in the memory 120 to start rekeying and which key to use to rekey the data. Initially, the rekeying starts at a starting address in the memory 120 such as address 0 and begins rekeying the data from that location and continues sequentially to an ending address. Of course, other starting locations may be used and/or the sequence may not be sequential. After the rekeying process starts, the rekeying logic 100 tracks the progress of the rekeying process by the memory address that has been last rekeyed and records the next address to be rekeyed in a register.

For example, the rekeying logic 100 sets and stores a boundary address B in a boundary register 140 to indicate the next address in the memory 120 to be rekeyed. As data in the memory 120 is rekeyed, the boundary address B is moved to reflect the next location to be rekeyed. When the rekeying process is paused/stopped due to the memory controller 130 no longer being in an idle state, the rekeying logic 100 uses the boundary address B as a restart point to continue the rekeying process during the next idle state of the controller 130.

The boundary address B is also used to differentiate a portion of the memory 120 that has been rekeyed from the remaining portion of the memory 120 that has not yet been rekeyed. Addresses on one side of the boundary B will use first key and addresses on the other side of the boundary B will use a second key. For example, as seen in FIG. 1 for purposes of explanation, suppose the data in memory portion 121 has been rekeyed with a new key and the data in memory portion 122 has been keyed with an old key and thus still needs to be rekeyed. Differentiating the different portions of memory allows the memory controller 130 to continue processing memory requests before the rekeying process completely rekeys the entire memory. Memory operations are affected by the incomplete rekeying process because some data is scrambled with the new key (portion 121) and other data is scrambled with the old key (portion 122).

Thus when a memory request is processed, the memory controller 130 compares the address from the memory request to the boundary address B from the boundary register. The comparison indicates if the memory request is requesting an address that is in memory portion 121 or 122. Depending on which portion the address is in, the memory controller 130 selects and uses the appropriate key that is associated with that memory portion (e.g., the new key or the old key). The memory request is then processed with the appropriate key to scramble/descramble the data from the associated portion of memory 120.

For example, suppose that none of the data in the memory 120 had been rekeyed; the boundary address B would be set by the rekeying logic 100 as the first address of the memory 120 (e.g., memory address 0). The memory controller 130 stores the boundary address B in the boundary register 140 to indicate that rekeying should begin with the data stored in the first address of the memory 120. During an idle cycle of the memory controller 130, the rekeying logic 100 retrieves the address boundary B from the boundary register 140 and provides the boundary address to the memory controller 130. The memory controller 130 can then retrieve the data at the address boundary B or wait to retrieve the data at the address boundary B until the memory controller 130 receives a key for rekeying.

In another example, consider that a first portion 121 of the memory 120 has been rekeyed and a second portion 122 has not been rekeyed. The boundary address B is set as the first address in the second portion 122 to indicate that the first address in the second portion 122 should be rekeyed during the next idle cycle of the memory controller 130. While the memory controller 130 is idle, the memory controller 130 will incrementally rekey the data stored in the memory 120 beginning with the data stored at the boundary address B in the memory 120.

In one embodiment, a selector logic 150 is configured to store the multiple keys that are used with the memory 120, select which keys to use in order to rekey the data, and provide the selected keys to the memory controller 130. In one embodiment, the selector logic 150 is implemented as a function of the rekeying logic 100. The memory controller 130 uses the keys selected by the selector logic 150 and the boundary address B to rekey the data.

For example, as discussed above, to rekey the data at the boundary address B, the selector logic 150 provides a first key 151 (e.g., old key) to descramble the data at the address in the memory 120. The first key 151 is the key that was used to originally scramble the data. The memory controller 130 then receives the second key 152 (e.g., new key) to re-scramble the data at the boundary address B. In one embodiment, the memory controller 130 may request the second key 152 to re-scramble the data from the selector logic 150 when the memory controller 130 determines that the data from the address has been descrambled. Accordingly, the data at the boundary address is rekeyed and the boundary address B is incremented to the next address in memory.

The memory controller 130 then stores the new boundary address B in the boundary register 140. The rekeying process is repeated for the data stored at the new boundary address and the process continues iteratively through the data in the memory 120 until all the data is rekeyed. But, as previously stated, the rekeying process is performed during idle periods of the memory controller 130. The rekeying process is paused/stopped when the memory controller 130 receives a memory request and thus is no longer idle. Accordingly, the rekeying process may start and pause multiple times before completion.

This technique allows memory requests to be processed during the paused rekeying process without delaying or interrupting the memory requests. The technique also allows the data in memory 120 to be rekeyed while the memory system is in an operational state. Thus the system (rekeying logic 100 and memory controller 130) is configured to cycle between or otherwise alternate between processing memory operations and performing rekeying operations based on the state or condition of the system.

Therefore, the key rotation, including rekeying of the data, does not require additional resources. Instead, the key rotation can occur as a background process thereby reducing delays and interruption to the normal operation of the memory controller 130 and memory 120. Also, as opposed to the situation when a computer system is powered down and turned back on to affect key rotation, here, the data stored in the memory 120 is still accessible during the rekeying process. Moreover, the contents of the memory 120 do not have to be rekeyed all at once in the described embodiments. Instead, access requests can be handled by selecting the key associated with the portion of the memory 120 being accessed.

Figure 2:
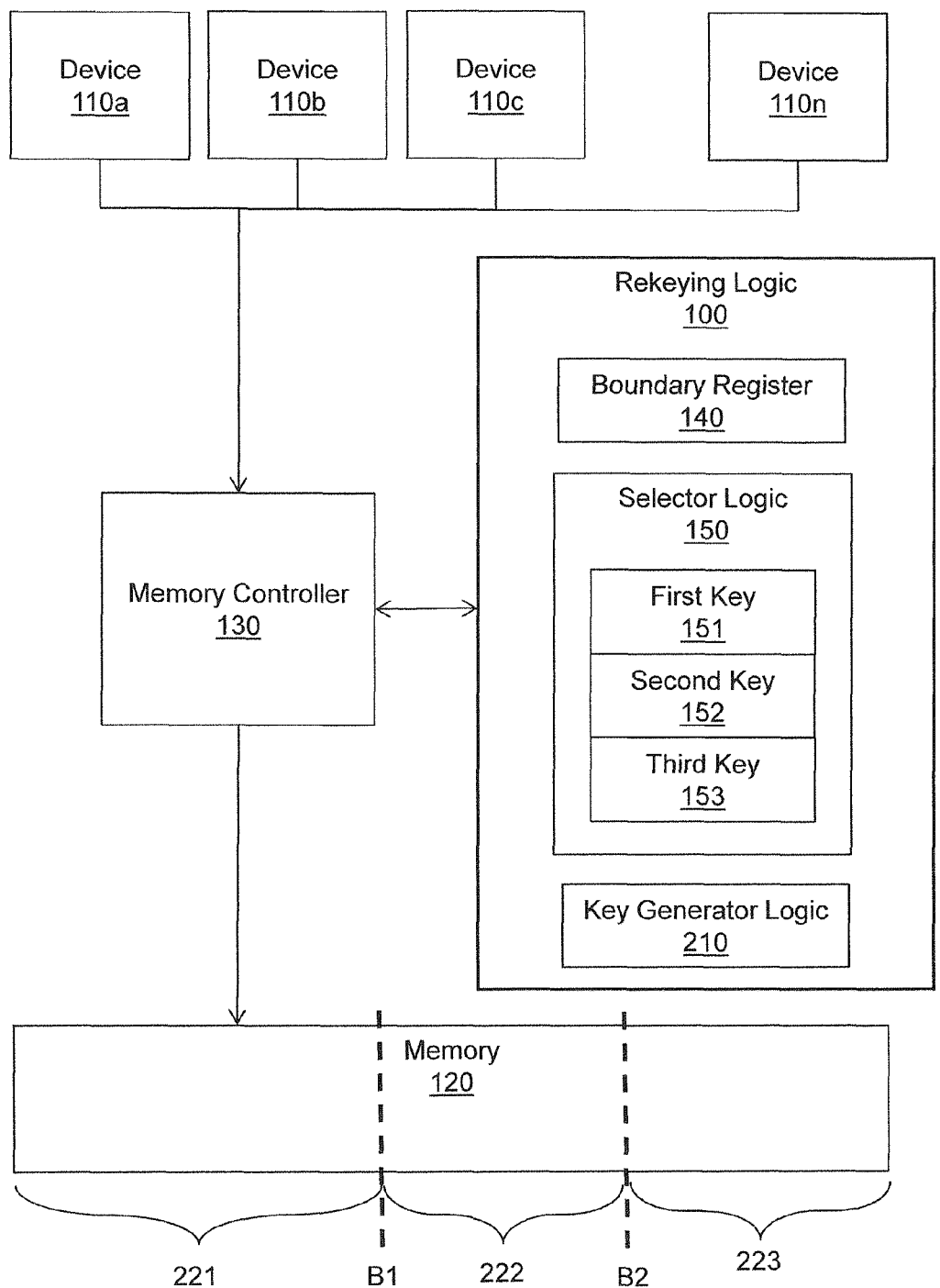
FIG. 2 illustrates one embodiment of a system associated with key rotation for a memory controller and a key generator.

FIG. 2 illustrates another embodiment of the rekeying logic 100 associated with key rotation for the memory controller 130, where the rekeying logic 100 includes key generator logic 210 for generating new keys. The rekeying logic 100 operates in a similar manner as described with reference to FIG. 1 but with additional functionality. For simplicity of explanation, two keys (the first key 151 and the second key 152) were described in FIG. 1. However, more keys may be used. In the embodiment of FIG. 2, three keys are shown: the first key 151, the second key 152, and a third key 153, which may be used to scramble the data in the memory 120 three different ways. Accordingly, the rekeying logic 100 is configured to store multiple boundary addressees (e.g., B1 and B2) in the boundary register 140 to identify which portions of memory 120 correspond to which key.

In one embodiment, the key generator logic 210 is configured to generate new keys so that older keys can be revoked. For example, at some point the rekeying of the memory 120 will have progressed such that there is no longer data stored in the memory 120 that is keyed according to the first key 151. Rather than reusing the first key 151, the rekeying logic 100 may decide to revoke (e.g., discards) the first key 151 and use the key generator logic 210 to generate a new key to replace the first key 151. The key generator logic 210 may include a random number generator or algorithm generator to generate keys. A key may be revoked and replaced based on a predefined time schedule or other condition as desired.

As discussed above, the rekeying logic 100 controls the rekeying process based on a state or condition of the system. For example, the rekeying logic 100 may use the idle cycles of the memory controller 130 to rekey data, use a time schedule to initiate rekeying, or automatically rekey data once a predetermined percentage of the data in the memory 120 has been rekeyed. In another embodiment, the rekeying logic 100 may rotate the keys when a predetermined amount of time elapses from the previous rekeying process.

For example, the rekeying logic 100 may be configured to rotate the keys based on a key rotation interval and may use different keys for different portions of memory. For example, if the interval is fifteen (15) seconds, then the data is rekeyed according to the first key 151 in a first 15 second interval, a next portion of data is rekeyed according to the second key in a second 15 second interval, and the data in a following portion is rekeyed according to the third key 153 in a third 15 second interval. In one embodiment, the key rotation interval may be determined by an amount of idle cycles observed from the memory controller 130 and the total size of the memory 120 being rekeyed. To increase the security level, the key rotation interval may be shortened.

Suppose that 15 seconds is not enough time to rekey the entire contents of the memory 120. To demarcate the portions of the memory 120 that have been rekeyed with a specific key, the rekeying logic 100 tracks the rekeying progress for each key by setting multiple boundary addresses in the boundary register 140. For instance, a first portion 221 of the memory 120 is defined as preceding the boundary address B1 (e.g., from address 0 to B1). In the example given above, the first portion 221 is keyed according to the first key 151. Likewise, a second portion 222 is defined as preceding address boundary B2 (e.g., from address B1+1 to B2) and is keyed according to the second key 152. A third portion 223 is defined as following boundary address B2 (e.g., from address B2+1 to last address) and is keyed according to the third key 153. Thus, multiple boundary addresses can be used to define borders in the memory 120 when three or more keys are used.

In another embodiment, the rekeying logic 100 may be configured to rotate keys in response to a predetermined number of memory access requests to the memory 120 being performed (e.g., setting a threshold). For example, the rekeying logic 100 may rotate the keys once the memory controller 130 has received 100 memory requests. The key rotation may also be initiated based on the components associated with a computer system and how they are used. In one embodiment, the rekeying logic 100 rotates the keys based on the number of idle cycles that elapse for the memory controller 130 and/or the size of the memory 120. Alternatively, the rekeying logic 100 may rotate the keys based, in part, on the number of keys available. For example, the more keys that are available, the more often the rekeying logic 100 may rotate the keys and re-scramble the memory 120.

In another embodiment, the rekeying logic 100 may rotate the available keys continuously in response to a rekeying process completing. For example, when all of the data of the memory 120 has been rekeyed according to the first key 151, a new rekeying process is initiated and the data is then rekeyed according to the second key 152. Once all of the data has been rekeyed according to the second key 152, the data is then rekeyed according to the third key 153, and then the data is rekeyed with the first key 151 again. Thus if there are three available keys, the process cycles through the three keys and repeats. Therefore, the available keys may be used repeatedly.

Figure 3:
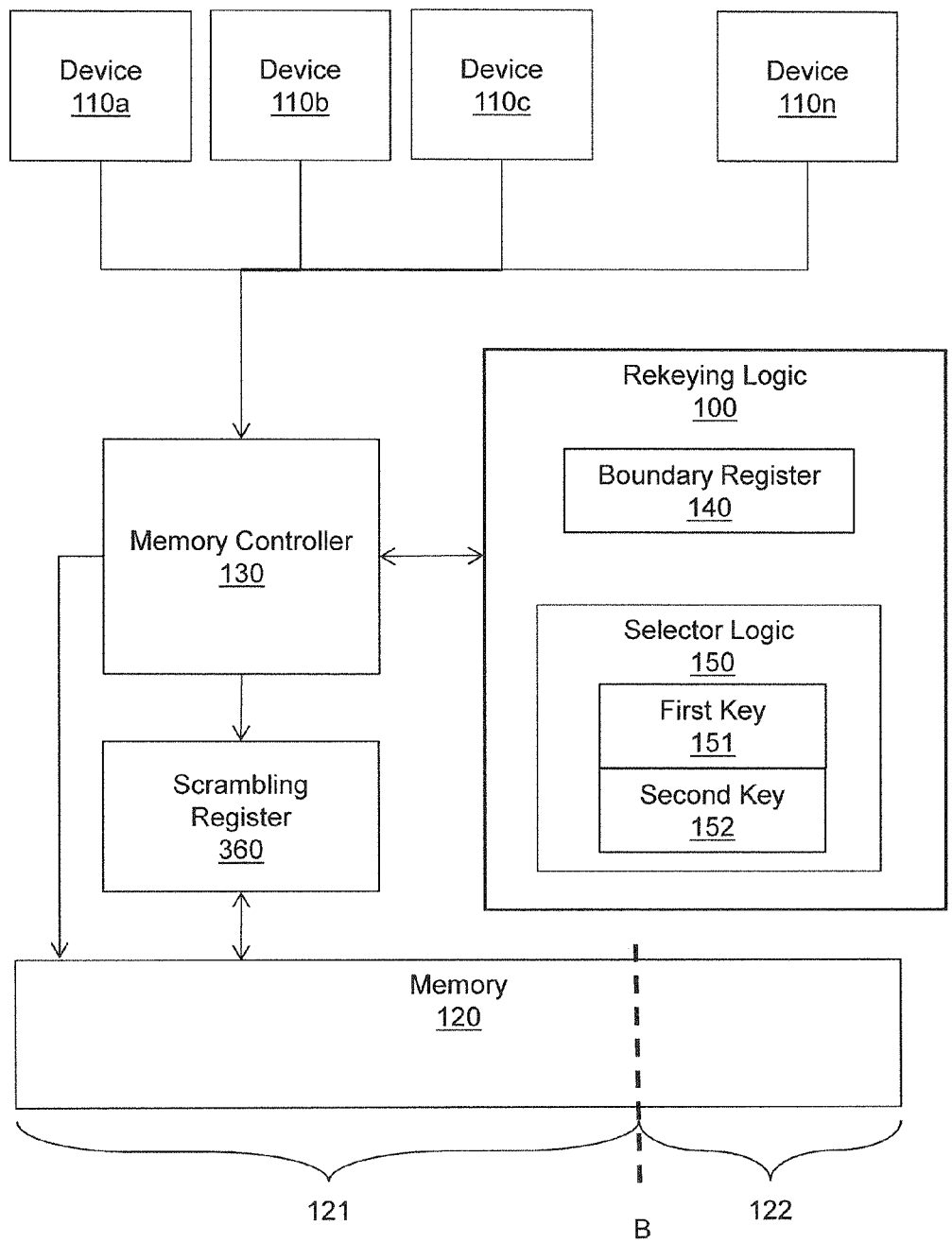
FIG. 3 illustrates one embodiment of a system associated with key rotation for a memory controller and a scrambling register.

FIG. 3 illustrates another embodiment of the memory system similar to FIG. 1 that includes the rekeying logic 100 and also includes a scrambling register 360. The rekeying logic 100 and the memory controller 130 operate in a similar manner as described above with respect to FIG. 1. The scrambling register 360 is used to hold and process data during the rekeying process. For example, the scrambling register 360 is used by the memory controller 130 to store data that has been read from the memory 120 but has not yet been scrambled according to a new key that is being applied to the memory 120. Data may be held in the scrambling register 360 when the rekeying process is interrupted or paused prior to completion.

This situation may occur when an idle cycle of the memory controller 130 is not long enough to descramble and re-scramble data stored at the address in the memory 120 currently being rekeyed. As previously stated, at some point during the rekeying process the memory controller 130 may receive a memory request and thus change from an idle cycle to an active cycle. This event causes the rekeying operation to be paused before the data has been descrambled and/or re-scrambled. Accordingly, the data read from the memory 120 and waiting to be rekeyed is stored in the scrambling register 360. If the process of rekeying is interrupted, the data stored in the scrambling register 360 can be rekeyed in a subsequent idle cycle once the rekeying process is re-started. Once the data has been rekeyed, the memory controller 130 restores the re-scrambled data in the memory 120 at the address from which it was read. Alternatively, the memory controller 130 may store the data from the boundary address B in the scrambling register 360 in response to the memory controller 130 receiving a memory access request.

Figure 4:
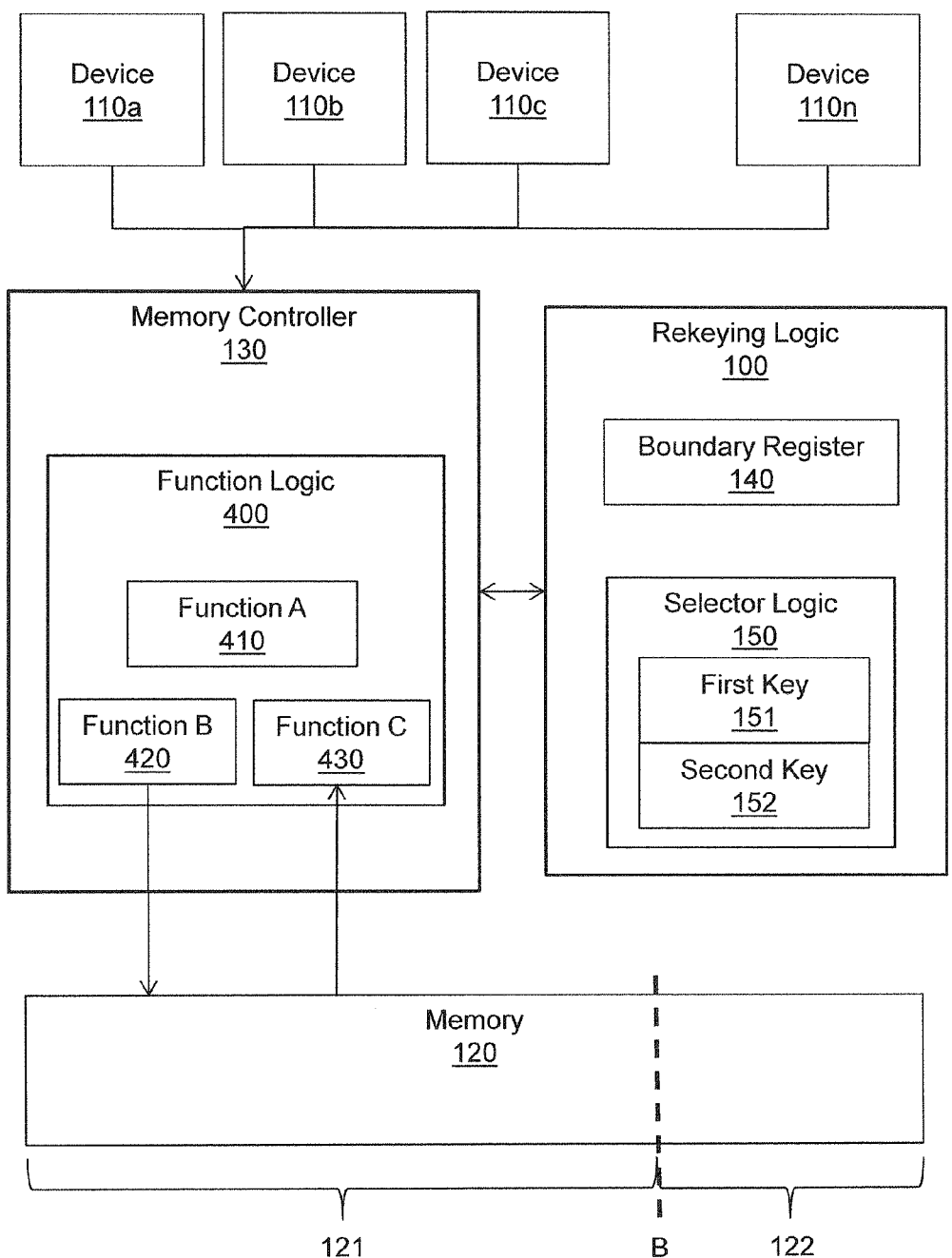
FIG. 4 illustrates one embodiment of a system associated with key rotation for a memory controller and a function logic.

FIG. 4 illustrates another embodiment of the memory controller 130 that includes function logic 400 that implements scrambling/descrambling functions. The memory controller 130 operates in a similar manner as described with reference to FIG. 1. As previously described, the rekeying logic 100 provides the memory controller 130 with a boundary address B at which to begin rekeying, and the selector logic 150 provides memory controller 130 with the key needed to rekey the data at the boundary address B.

In one embodiment, function logic 400 of the memory controller 130 is configured to use the boundary address B and key provided to the memory controller 130 by the rekeying logic 100 to generate a scrambling function that can scramble and/or unscramble data. Consider an example where the data of the memory 120 is being rekeyed according to the second key 152 but was previously scrambled with the first key 151. The data of the memory 120 is thus being descrambled according to the first key 151 and then re-scrambled according to the second key 152.

In one embodiment, function A 410 is configured to combine a key with a boundary address and uses the combination to generate function B 420. Function B 420 scrambles the data at the boundary address B according to the second key 152. Function A 410 is also used to generate Function C 430. In one embodiment, function C 430 is an inverse function of function B 420. Function C 430 is used to descramble data at the boundary address B based on the key provided in Function A 410. Of course, other types of scrambling/descrambling functions may be implemented.

Figure 5:
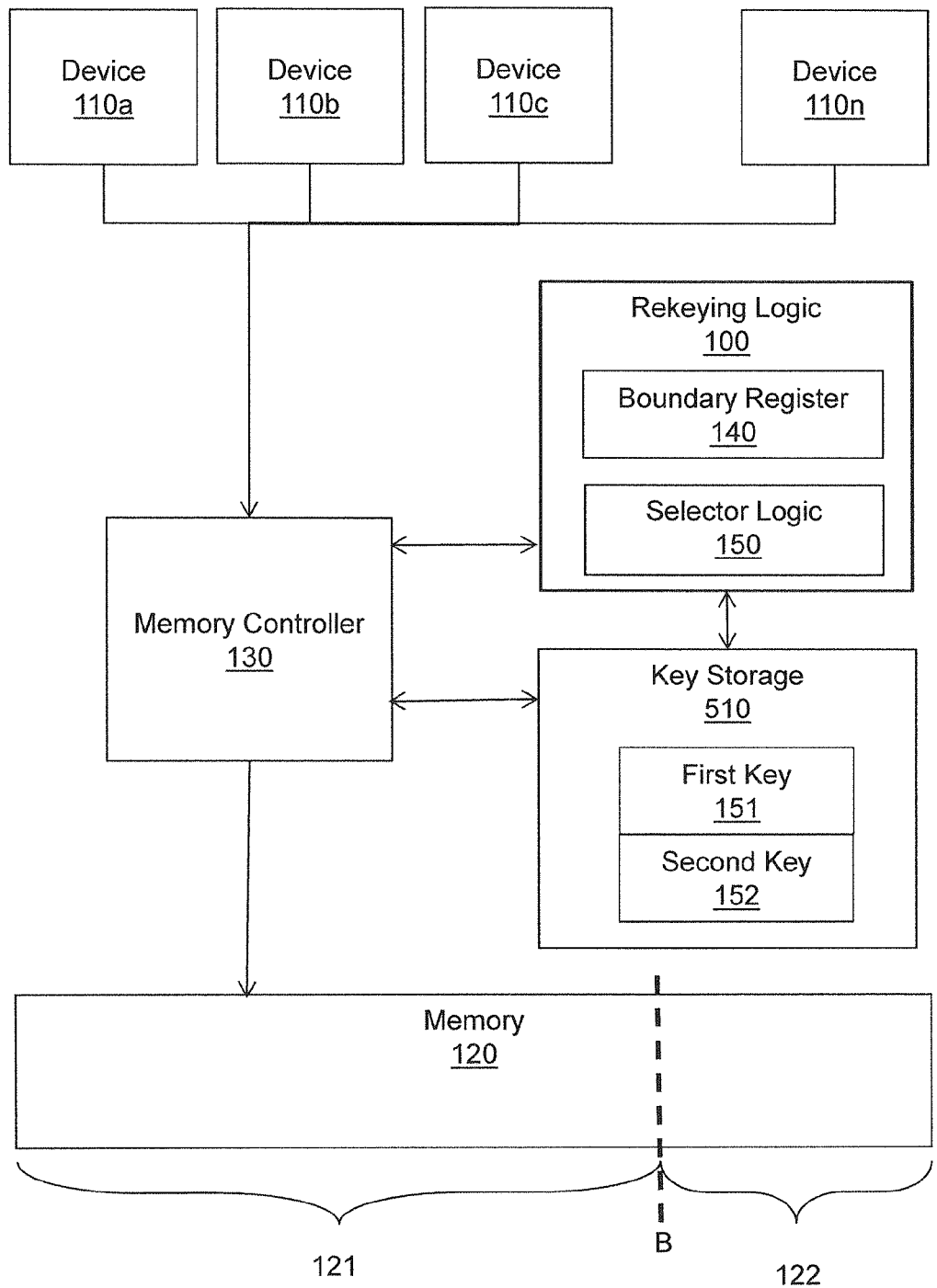
FIG. 5 illustrates one embodiment of a system associated with key rotation for a memory controller and key storage.

FIG. 5 illustrates one embodiment of a rekeying system that includes the rekeying logic 100, memory controller 130, and a key storage 510. The rekeying logic 100 operates in a similar manner as described above with respect to FIG. 1 and/or other figure. However, unlike the embodiment described in FIG. 1, the scrambling keys (e.g., first key 151 and second key 152) are not stored in conjunction with the selector logic 150. Instead, the key storage 510 stores and controls access to the keys. In one embodiment, the key storage 510 may be a secure processor or memory responsible for storing and loading keys when requested.

As discussed above, the selector logic 150 selects the appropriate key to be used for descrambling and/or re-scrambling the data at the boundary address B. With the keys being stored in the key storage 510, the selector logic 150 is configured to request the selected key from the key storage 510 on behalf of the memory controller 130. If the request is approved, the key storage 510 loads the key to the memory controller 130. When the memory controller 130 receives the key (e.g., the first key 151) from the key storage 510, the memory controller 130 descrambles data read from the boundary address B and continues the rekeying process. Likewise, other available keys may be requested and loaded to the memory controller from the key storage 510. In this manner, the key storage 510 provides an additional layer of security.

Figure 6:
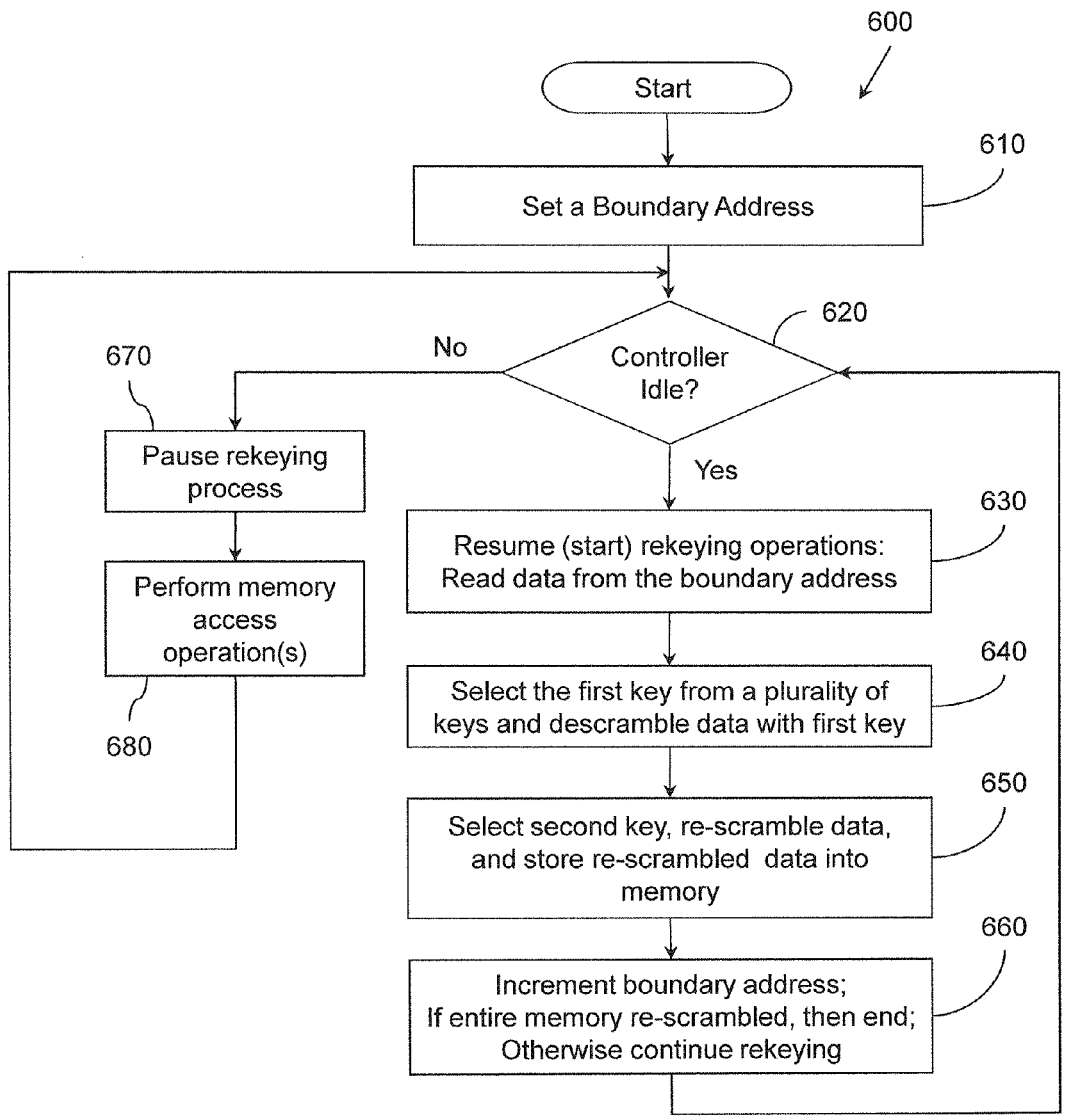
FIG. 6 illustrates one embodiment of a method associated with key rotation for rekeying data.

FIG. 6 illustrates one embodiment of a method 600 associated with key rotation and rekeying data as described previously. Method 600 is a computer implemented process that performs rekeying of data during idle cycles of memory operations such that the rekeying process is interrupted and paused to allow memory operations to be performed. The rekeying process is then resumed during the next idle cycle. In other words, normal memory access is performed in the computer and the rekeying operations are embedded or inserted in between memory operations during idle cycles. Thus the rekeying process is not limited to be performed during a system reset or power-up where the rekeying is performed for the entire memory and memory operations are not performed.

Initially, at 610, a boundary address is set at which the rekeying will start. For example, the rekeying starts at the lowest memory address (e.g., 0) and progresses to the highest memory address. After rekeying beings and is subsequently paused, the boundary address indicates where the rekeying will resume.

At 620, the method determines if the memory controller is idle. As previously explained, the memory controller is idle when there are no memory access requests pending. In one embodiment, a notice from the memory controller may be received that indicates an idle cycle, or a memory request queue may be checked to see if the queue is empty. If the controller is idle, then the method goes to block 630 where the rekeying process starts or resumes, and data from the memory at the boundary address is read.

At 640, the appropriate key (a first key) is selected from a set of available keys to descramble the data. The first key is the key that originally was used to scramble the data and now is used to descramble the data to its original form. At 650, a new scrambling key (a second key) is selected and the data is re-scrambled using the second key. In general, scrambling and descrambling uses one or more functions in combination with the key to encrypt or decrypt data. The re-scrambled data is then stored back to its address in memory.

At 660, the boundary address is incremented to the next memory address. The rekeying process determines if the entire memory has been re-scrambled or not. This can be determined by comparing the current boundary address to the last memory address. If the entire memory has been re-scrambled, then the old key (the first key) is no longer needed and is discarded. The new key (second key) is set as the new master key for the memory until it is replaced by a new key. The rekeying process ends and waits until the next rekeying interval or condition occurs to once again rekey the memory.

If at 660 the rekeying process is incomplete, then the method returns to 620 and repeats if the memory controller is still idle. If the controller is not idle, then the method goes to 670 where the rekeying process is paused and at 680, one or more memory access operations are performed. The process returns to 620 and repeats.

In one embodiment, the memory access operations are given priority over rekeying operations such that the rekeying is interrupted/paused in order to process access requests. In another embodiment, thresholds may be set to allow a certain number of access requests to process and then a certain number of rekeying operations to process. In either case, since the memory is not rekeyed in its entirety all at once, the memory will have two areas of data that are scrambled with different keys. The areas are defined by the boundary address. As such, memory access operations are dependent upon the area that is being accessed and the corresponding key. This has been described previously with reference to system diagrams and will now be described with reference to a flow chart shown in FIG. 7.

Figure 7:
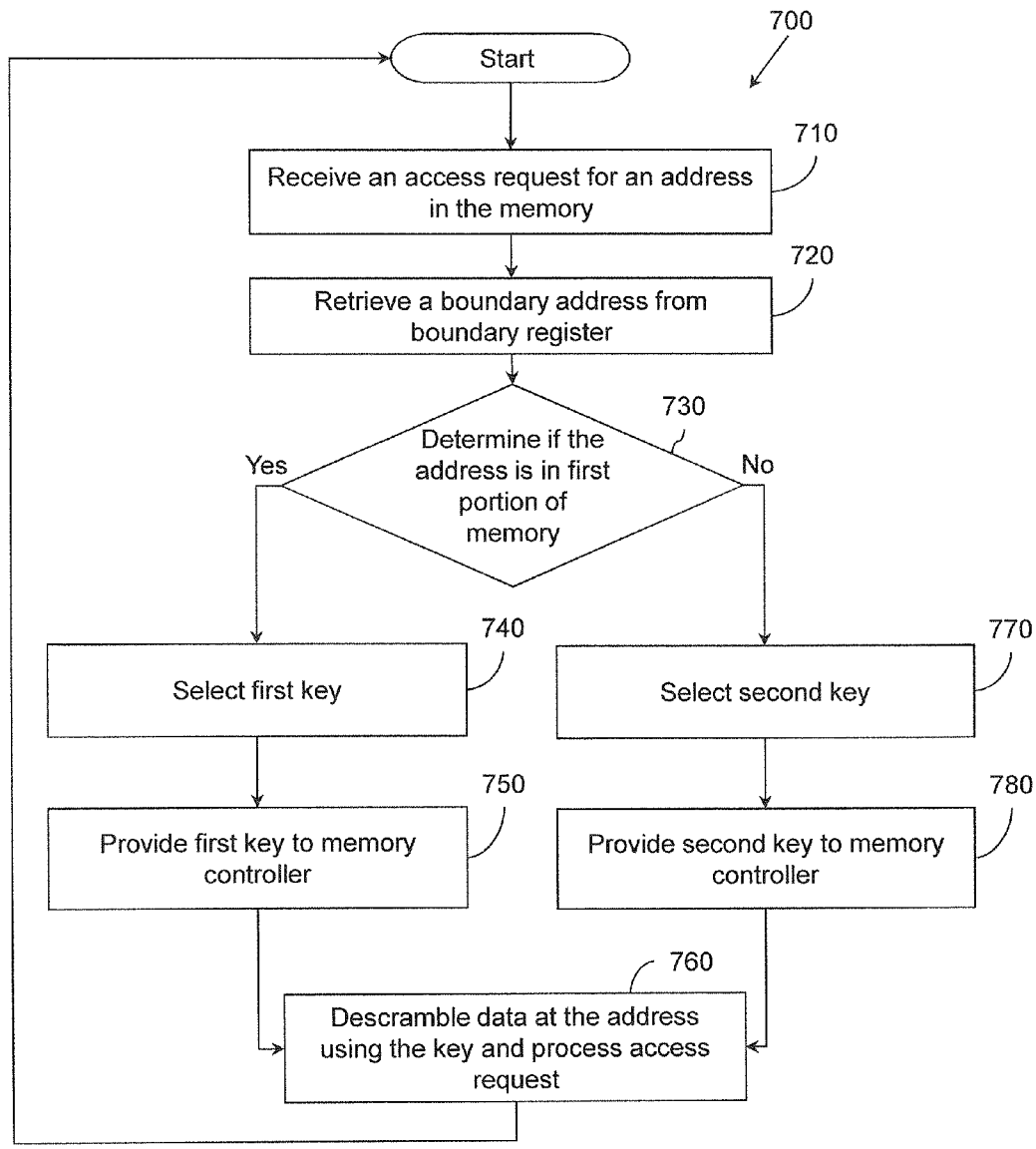
FIG. 7 illustrates one embodiment of a method associated with processing a memory request that is received while data rekeying is not complete.

FIG. 7 illustrates one embodiment of a method 700 associated with processing memory requests in a memory system that implements the key rotation techniques described previously (for example, as part of block 680 of FIG. 6). Since rekeying of data may be interrupted and incomplete as previously described, different portions of the memory may be scrambled with different keys. Method 700 will be described with reference to the memory having two portions of memory that are scrambled with two different keys due to the rekeying process not being entirely completed. Accordingly, memory access requests are processed based on the location of the address in the memory and the corresponding key. The data in the address of the access request needs to be descrambled with the key that was used to scramble the data in order to correctly retrieve the original data.

At 710, the method initiates by receiving a memory access request (e.g., a read request) for data at an address in the memory. To provide accurate data, the data at the address needs to be descrambled before being returned as the result of the access request. The appropriate key is determined for the portion of memory. At 720, the boundary address is retrieved from, for example, the boundary register. As previously example, the boundary address indicates the currently location of the rekeying process and thus indicates the boundary between a first portion of the memory (the rekeyed portion with the new key) and a second portion (portion needs to be rekeyed, data is scrambled with old key). Accordingly, the boundary address can be used to determine whether the address in the access request is in the first portion of the memory or the second portion of the memory. Thus the boundary address is used to identify which key is used to descramble the data in the memory.

At 730, it is determined whether the address is in the first portion of the memory. If the requested address is in the first portion of the memory (e.g., below than the boundary address), the method goes to block 740 where the first key is selected to descramble the data. At 750, the first key is provided to the memory controller to descramble the data stored in the requested address. At 760, the data at the requested address is descrambled with the provided key and the data is returned to the requestor.

Alternatively, if at 730 it is determined that the address is in the second portion of the memory (e.g., equal to or higher than the boundary address), the method goes to 770 where the second key is selected to descramble the data. At 780, the second key is provided to the memory controller. Then at 760, the data is descrambled with the second key, and the data is returned to the requestor. The process is repeated for the next memory request.

If the memory access request is a write request, the process is slightly different since the data to be written is first scrambled with the appropriate key depending on which portion of memory the data is being written to. For example, the method determines which portion of memory that the requested write address is in based on the boundary address (e.g., compare requested write address to boundary address). If the requested write address is in the first portion, then the data to be written is scrambled with the first key, otherwise the data is scrambled with the second key. Then the scrambled data is written to the memory location at the requested write address. In one embodiment, the memory controller is configured to perform these functions.

If a rekeying process of the memory is still pending during the process of method 700, then when the memory controller becomes idle and there are no access requests to process, the method 600 is invoked and the rekeying process is resumed for the next data at the boundary address.

With the disclosed techniques, data stored in a memory does not have to be completely rekeyed before the data of the memory can be accessed. Instead, the data stored in the memory is intermittently rekeyed in portions while memory operations are permitted to continue during the rekeying process. Therefore, the key rotation does not shut down the memory or require to be performed only at system reboot/reset.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer storage medium" as used herein is a non-transitory medium that stores instructions configured to perform any of the disclosed functions, and/or data in combination therewith. A computer storage medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer storage media may include, but are not limited to, a floppy disk, a flexible disk, a hard disk, a magnetic tape, other magnetic medium, an ASIC, a compact disk, other optical medium, a RAM, a ROM, a memory chip or card, a memory stick, and other electronic media that can store computer instructions and/or data. Computer storage media described herein are limited to statutory subject matter under 35 U.S.C §101.

"Logic" as used herein includes a computer or electrical hardware component(s), firmware, a non-transitory computer storage medium that stores instructions, and/or combinations of these components configured to perform any of the functions or actions disclosed, and/or to cause a function or action from another logic, method, and/or system. Logic may include a microprocessor controlled by an algorithm configured to perform any of the disclosed functions, a discrete logic (e.g., ASIC), an analog circuit, a digital circuit, a programmed logic device, a memory device containing instructions that when executed perform an algorithm, and so on. Logic may include one or more gates, combinations of gates, or other circuit components. Where multiple logics are described, it may be possible to incorporate the multiple logics into one physical logic component. Similarly, where a single logic unit is described, it may be possible to distribute that single logic unit between multiple physical logic components. Logic as described herein is limited to statutory subject matter under 35 U.S.C §101.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional actions that are not illustrated in blocks. The methods described herein are limited to statutory subject matter under 35 U.S.C §101.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this disclosure is intended to embrace alterations, modifications, and variations that fall within the scope of the appended claims, which satisfy the statutory subject matter requirements of 35 U.S.C. §101.

What is claimed is:

1. A memory system, comprising:
   a memory;
   a memory controller connected to the memory, wherein the memory controller is configured to control access to the memory and to process memory access requests; and
   rekeying logic configured to rotate a first key that was used to scramble data in the memory and re-scramble the data with a second key wherein the rekeying logic is configured to:
      determine when the memory controller is in an idle cycle and performing a rekeying operation on a portion of the memory during the idle cycle; and pause the rekeying operation when the memory controller is not in an idle cycle to allow memory access requests to be performed and resuming the rekeying operation during a next idle cycle;

wherein the rekeying logic is further configured to initiate the rekeying operation based at least in part on a key rotation interval that is determined by an amount of idle cycles determined from the memory controller and a total size of the memory being rekeyed; and wherein the memory controller is configured to perform a write access request that indicates data to be written at a requested address by:
  determining if the requested address is in a first portion or a second portion of the memory based on a boundary address that indicates a position of the rekeying operations, wherein the first portion has been scrambled using the first key and the second portion has been scrambled by the second key;
  selecting the first key or the second key based on the determination; and
  scrambling the data from the write access request using the selected key and writing the scrambled data to the requested address in the memory.

2. The memory system of claim 1, further comprising a boundary address register wherein the rekeying logic is configured to store the boundary address in the boundary address register that identifies a location of a next rekeying operation.

3. The memory system of claim 1, wherein the memory controller is configured to send a rekeying notice to the rekeying logic that indicates that the memory controller is in the idle cycle.

4. The memory system of claim 1, further comprising selector logic configured to select the first key or the second key to be used for processing a memory access request based, at least in part, on the boundary address that indicates which key was used to scramble the memory at a location specified in the memory access request.

5. The memory system of claim 1, wherein the rekeying logic is configured to intermittently perform the rekeying operations in between memory access requests.

6. The memory system of claim 1, wherein the memory controller is configured to perform a read access request for a requested address by:
  determining if the requested address is in the first portion or the second portion of the memory based on the boundary address that indicates the position of the rekeying operations, wherein the first portion has been scrambled using the first key and the second portion has been scrambled by the second key;
  selecting the first key or the second key based on the determination; and
  descrambling data from the requested address using the selected key and returning the descrambled data.

7. The memory system of claim 1, further comprising a scrambling register for storing the data from the boundary address when an access request to access the memory is received before the data at the boundary address is rekeyed by the rekeying logic.

8. The memory system of claim 1, further comprising function logic to generate functions for rekeying the data at the boundary address, the functions including a first function for descrambling the data with the first key and a second function for re-scrambling the data with the second key.

9. The memory system of claim 1, further comprising a key storage for storing and controlling access to the first key and the second key.

10. A method, comprising:
  setting a boundary address in a memory for a rekeying operation that rotates keys for data in the memory;
  in response to receiving memory access requests, processing, by a memory controller, the memory access requests to the memory;
  determining when the memory controller is in an idle cycle and in response to being in the idle cycle, the method comprises:
    performing the rekeying operation on a portion of the memory at the boundary address during the idle cycle;
    incrementing the boundary address and repeating the rekeying operation; and
    pausing the rekeying operation when the memory controller is not in an idle cycle to allow the memory access requests to be performed and resuming the rekeying operation during a next idle cycle;
  wherein the rekeying operation is initiated based at least in part on a key rotation interval that is determined by an amount of idle cycles determined from the memory controller and a total size of the memory being rekeyed; and
  in response to receiving a write access request that indicates data to be written at a requested address, the method comprises:
    determining if the requested address is in a first portion or a second portion of the memory based on the boundary address that indicates a position of the rekeying operations, wherein the first portion has been scrambled using a first key and the second portion has been scrambled by a second key;
    selecting the first key or the second key based on the determination; and
    scrambling the data from the write access request using the selected key and writing the scrambled data to the requested address in the memory.

11. The method of claim 10, wherein performing the rekeying operation includes descrambling data stored at the boundary address using the first key that was used to scramble the data, re-scrambling the data with the second key, and storing the re-scrambled data at the boundary address in the memory.

12. The method of claim 10, wherein determining when the memory controller is in an idle cycle includes receiving a rekeying notice that indicates that the memory controller is in the idle cycle.

13. The method of claim 10, further comprising selecting the first key or the second key to be used for processing a memory access request based, at least in part, on the boundary address.

14. The method of claim 10, wherein the rekeying operations are performed intermittently in between the processing of the memory access requests.

15. The method of claim 10, wherein for a memory access request that is a read access request for a requested address, the method further comprises:
  determining if the requested address is in the first portion or the second portion of the memory based on the boundary address, wherein the first portion has been scrambled using the first key and the second portion has been scrambled by the second key;
  selecting the first key or the second key based on the determination; and
  descrambling data from the requested address using the selected key and returning the descrambled data.

16. A method comprising:

setting a boundary address in a memory for a rekeying operation that rotates encryption keys for data in the memory, wherein the boundary address is a boundary between a first portion of the memory that is encrypted with a first key and a second portion of the memory that is encrypted with a second key;

determining idle cycles of a memory controller, wherein an idle cycle is when the memory controller is not processing access requests to the memory, and determining an amount of idle cycles of the memory controller;

determining a key rotation interval based on the amount of idle cycles determined from the memory controller and a total size of the memory for the rekeying operation;

initiating the rekeying operation based on the key rotation interval; and in response to receiving an access request for a requested address in the memory during the rekeying operation:
pausing the rekeying operation;
comparing the requested address to the boundary address to determine if the requested address is in the first portion or the second portion of the memory;
selecting the first key or the second key based on the comparison; and
processing the access request using the selected key and resuming the rekeying operation during a next idle cycle of the memory controller; wherein when the access request is a write access request that indicates data to be written at the requested address, then the processing includes scrambling the data from the write access request using the selected key and writing the scrambled data to the requested address in the memory.

17. The method of claim 16, further comprising:

determining an idle cycle of the memory controller when there are no access requests pending to be completed; and in response to the idle cycle being determined, resuming the rekeying operation to rotate the encryption keys.

18. The method of claim 16, further comprising performing the rekeying operations intermittently in between the processing of the access requests.

* * * * *